June 1, 1965   G. O. ETCHISON ET AL   3,186,886
PROCESS OF MANUFACTURING FUSIBLE INTERLINING
Filed Dec. 12, 1961
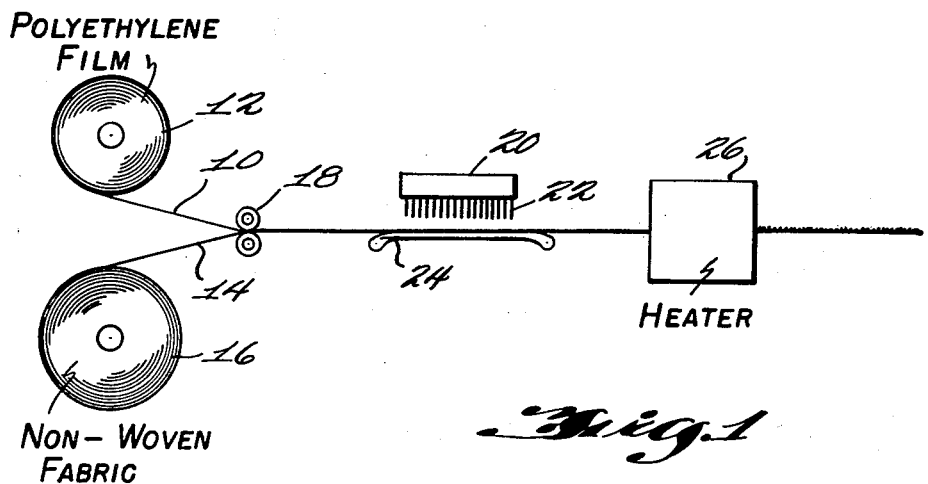
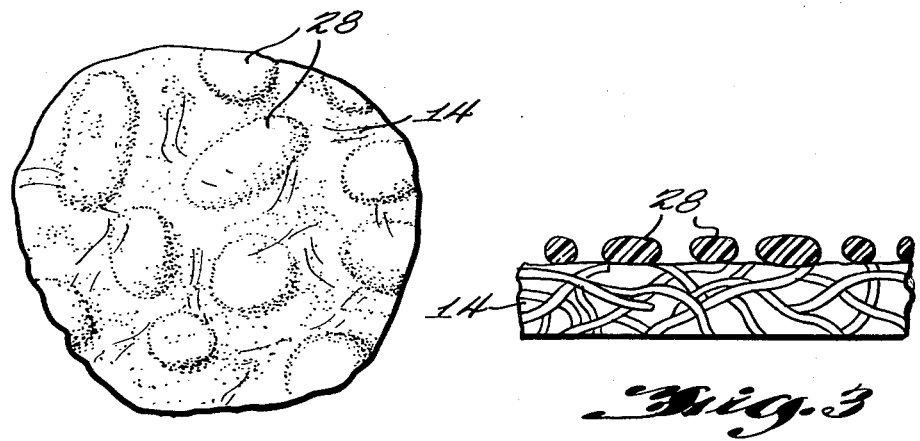
INVENTORS
GIBSON O. ETCHISON
CLARENCE E. POE
By Cushman, Darby & Cushman
ATTORNEYS 3,186,886
PROCESS OF MANUFACTURING FUSIBLE
INTERLINING
Gibson O. Etchison, Riverview, and Clarence E. Poe, Shawmut, Ala., assignors to West Point Manufacturing Company, West Point, Ga., a corporation of Georgia
Filed Dec. 12, 1961, Ser. No. 158,756
5 Claims. (Cl. 156—253)

This invention relates to fusible interlining, and in particular to a novel and improved process for applying polyethylene to the surface of non-woven fabric, whereby the fabric may be readily applied and adhered to other fabric by means of heat and pressure.

Interlinings are commonly employed in the garment industry to back up and give body to garments or portions of garments, and the term includes fabrics utilized for similar purposes including facing, edging and the like. Fusible interlinings are conventionally provided with thermoplastic particles or coatings on one surface thereof, by means of which they may be applied to other fabrics simply by hot pressing. Fusible interlinings may be applied to woven, knitted and non-woven fabrics with equal ease and efficiency, without stitching and attendant disadvantages such as puckering.

A principal object of the present invention is to provide an improved process for manufacturing fusible interlining, wherein polyethylene is efficiently applied to a surface of non-woven fabric in such manner as to produce thereon adherent globules of optimum size, shape and distribution.

A related object is to provide a process for applying polyethylene to non-woven fabric in which the properties and quantity of the polyethylene, and the uniformity and character of its distribution, are readily and positively controlled.

Another object is to provide an efficient and inexpensive process for applying polyethylene to non-woven fabric, utilizing only common, widely available equipment. Further objects will be in part evident, and in part pointed out hereinafter.

The invention and the novel features thereof will be made clear and readily understood from the following description and the accompanying drawings, in which:

FIGURE 1 is a diagrammatic sketch illustrating a preferred embodiment of the invention;

FIGURE 2 is a face view of an exemplary fusible interlining manufactured in accordance with the invention, illustrating the distribution and form of polyethylene globules on the surface of a non-woven fabric; and FIGURE 3 is a sectional view of the FIGURE 2 product.

In accordance with the present invention, perforated polyethylene film is placed in surface contact with a non-woven fabric, and the assembly is then heated sufficiently to melt the polyethylene and cause it to form into small globules firmly adherent to the surface of the fabric. A preferred procedure is illustrated in FIGURE 1 of the drawings, wherein a polyethylene film 10 is drawn from a roll 12, and a non-woven fabric 14 is drawn from a roll 16, the film 10 and fabric 14 being brought together in surface contact by the guide roll pair 18. In accordance with the preferred procedure, the roll 12 of film 10 is imperforate, and the assembly is conducted through a conventional needle loom 20 to perforate the film. As shown, the loom needles 22 are above and face the underlying support 24.

In perforating the film by means of a needle loom, the non-woven fabric 14 serves merely as a convenient underlying support for the film through the perforating operation. That is, the non-woven fabric base is not needled in the conventional sense, and need not be penetrated by the needles, although penetration of the non-woven fabric is not detrimental. The needle loom, accordingly, may be adjusted so that the needles just penetrate the film, or so that the needles penetrate to a depth of ¼ or ⅜ inch. If the needles are barbed, however, the adjustment should be such that the barbs do not encounter the film.

After the firm is perforated the assembly, or at least the film side thereof, is heated by radiant heat or in similar conventional fashion to melt the film. As shown in FIGURE 1, the assembly may conveniently be conducted through an oven or heater 26, wherein the film is heated sufficiently to melt the polyethylene and cause it to form into small globules adherent to the surface of the underlying fabric. Melting appears to start about the circumference of each perforation, and the polyethylene melts and retracts from the individual perforations, drawing up into small spheres, cylindrical shapes, and particles of similar rounded form, which encompass surface fibers of the base fabric. On cooling, the process is complete, and the fusible interlining product is ready for sale and use.

FIGURE 2 illustrates the shape and configuration of the polyethylene globules 28 of the finished product, distributed in apparently random fashion on the base fabric 14. As shown, the globular layer is largely discontinuous and irregular, but the globules are yet distributed over the surface of the base fabric with exceeding uniformity, each unit area of the base fabric 14 having substantially the same weight of globules adherent thereto and distributed uniformly thereover. As shown in FIGURE 3, the globules 28 do not penetrate into the base fabric, but remain on the surface thereof except to the extent they may encompass the surface fibers of the fabric.

The process may be utilized with a wide range of non-woven fabrics, varying in weight, thickness, fiber content, binders and the like. The non-woven fabric to which the polyethylene is applied, however, is preferably a finished fabric, ready for use. By way of example, a suitable interlining fabric may be air laid in accordance with Phillips et al. Patent No. 2,648,876,, and bonded by passage through a liquid dispersion of resinous and/or elastomeric material, followed by removal of excess impregnant and drying. The bonded fabric may then be rebonded by a second passage through a liquid binder, cured and/or set if appropriate to the binder, and subsequently calendared and subjected to other conventional finishing procedures. In other words, the non-woven fabric used in the process is an integral finished fabric, cohesively bonded. The fibers and binder, of course, must be able to withstand the heat of the polyethylene melting step without substantial detriment, but as appears hereinafter the application of heat for such purpose is of such mild nature that very few if any conventional non-woven fabrics would be detrimentally affected thereby.

For the purpose of the present invention, film of relatively low melting point polyethylene is preferred. A common rating applied to polyethylene film, indicative of its melting point, is the melt index, which may be defined as the average weight in grams extruded in a specified time through a standard jet under a standard load and at a standard temperature, as described in ASTM D1248–52T. Polyethylene film having a melt index between about 30 and about 200 may be advantageously employed in the present invention, a melt index in the upper part of this range being generally preferred. The polyethylene film may be of any type commercially available, including "Visqueen" polyethylene film available from Visking Corporation, and "Tenite" polyethylene film available from Tennessee Eastman Company. The thickness of the polyethylene film may be as little as about 0.5 mil and as much as about 3.0 mils, a thickness of 1.5 mils being most advantageous for many purposes. A 1.5 mil film results in application of about 1 ounce of polyethylene per square yard of non-woven base fabric, and the preferred range of thickness of the film corresponds to application of from about ⅓ ounce to about 2 ounces of polyethylene per square yard of base fabric. As will be obvious, the quantity of polyethylene applied and its melting characteristics are positively controlled by selection of the film material and thickness. Since the film is substantially uniform in thickness, controlled melting readily effects uniformity of distribution of the polyethylene material on the interlining fabric.

The perforations of the polyethylene film may be uniformly spaced and arranged, or they may be in a random pattern, although the perforations should be substantially uniformly distributed over the area of the film. The size and shape of the perforations are not critical. For example, the perforations may be approximately 1/32 inch in diameter or less, or they may be 1/16 inch in major dimension or somewhat larger. The perforations may be round and regular, or they may be triangular, square or of irregular form. If the perforations are effected by means of needles, some may constitute displaced flaps of irregular shape, and such perforations are quite as effective for purposes of the present invention as are any others. If the perforations are applied by a conventional needle loom, No. 32 needles may conveniently be employed, but No. 25 or No. 36 needles may be used as well.

The number of perforations applied to the film is, however, of considerable importance, and to attain the desired melt pattern of polyethylene in the finished product, it has been found that the number of perforations should be at least about 150 per square inch, and not substantially more than about 900 per square inch. From about 650 to about 700 perforations per square inch has been found to result in optimum melt conditions, and optimum polyethylene particle distribution and form in the finished product. If the number of perforations is too low, melting of the film is variable and difficult, and a non-uniform irregular product results not well adapted for use as fusible interlining. If the number of perforations in the film is too high, the melting is similarly difficult to control, and the ultimate polyethylene particle form and distribution is materially less desirable.

Depending somewhat on the melting index and thickness of the polyethylene film, the time and temperature of the heating and melting step may be somewhat varied. In passage through an oven, for example, it has been found satisfactory to expose the assembly to a temperature ranging from about 250 to about 320° F., for a period of time ranging from about 10 to about 60 seconds. As will be evident, a higher temperature and time of exposure is in order with higher melting point polyethylene, and with thicker film, than is the case with lower melting polyethylene, or thinner film. The apparent melting mechanism has been described above, it will be readily recognized therefrom that the number of perforations per unit area in the film materially affects the particle size, form and distribution in the finished product. Also the perforations appear to facilitate and regulate heating and melting of the polyethylene.

While in the preferred procedure, the film is perforated by means of a needle loom while supported by the non-woven fabric, it should be recognized that the film may be perforated in any other desired manner. For example, the film may be perforated by means of a roller having needles extending from its cylindrical surface. Similarly, the film may be perforated in a separate step, before it is brought into contact with the base fabric.

The following is a specific example of practice of the invention. Tenite 884A polyethylene film, 30 melt index, 1½ mil, was plied with a standard interlining non-woven fabric, and the assembly passed through a conventional Hunter needle loom, with the film uppermost and facing the needles. The loom was equipped with No. 32 needles, and the machine adjusted to effect ⅜ inch penetration, whereby the needle barbs at no time encountered the film. 650 perforations per square inch were applied to the film, and the assembly was then passed through an oven in which an ambient temperature of 320° F. was maintained, the assembly remaining in the oven for 25 seconds. The polyethylene melted and retracted into adherent globules arranged in a pattern suggestive of a spider web, uniformly distributed over the fabric. Approximately one ounce of polyethylene was applied per square yard of fabric. The product was cooled and subsequently applied to broadcloth by placing the polyethylene side of the non-woven fabric in contact with the broadcloth and applying a dry iron. The temperature of ironing was approximately 390° F. and the time of application approximately 3 seconds. The fusible interlining was firmly adhered in this manner to the broadcloth, over its entire area, and exhibited excellent resistance to delamination. After repeated dry cleanings, the interlining was still firmly adhered to the broadcloth, and after repeated severe washings, the same was true.

In another example illustrating the invention, Tenite X 1865–88D polyethylene film, 70 melt index, 1½ mil, was perforated with the needle loom of the previous example without a support backing, again applying 650 perforations per square inch. The perforated film was then plied with a finished non-woven fabric, and passed through an oven at 300° F., the heating time in this case being 15 seconds.

The polyethylene in the course of the heating step retracted into adherent globules arranged in a distinctive uniform discontinuous pattern. The quantity of polyethylene adhered per square yard of base fabric was slightly in excess of .9 ounce per square yard. The completed and cooled interlining product was subsequently applied to broadcloth in the manner of the previous example, and was equally firmly adherent thereto and resistant to delamination. The fused laminate was similarly unaffected by repeated dry cleanings and severe washings.

It will thus be seen that it has been provided by this invention a process in which the various objects hereinbefore set forth, together with many practical advantages, are successfully achieved. As various possible embodiments may be made of the novel features of the above invention, without departing from the scope thereof, it is to be understood that all matter hereinbefore set forth or shown in the accompanying drawings is to be interpreted as illustrative, and not in a limiting sense.

We claim:

1. Process of manufacturing fusible interlining comprising the steps of contacting a non-woven fabric with a polyethylene film having a thickness of from about 0.5 mil to about 3.0 mils, said film having from about 150 to about 900 perforations per square inch, and then heating the assembly sufficiently to melt the polyethylene and cause it to form into small globules adhered to the surface of the fabric.

2. Process in accordance with claim 1, wherein said polyethylene film is perforated while supported on the non-woven fabric.

3. Process in accordance with claim 1, wherein the number of perforations in said film is from about 650 to about 700 per square inch.

4. Process in accordance with claim 1, wherein the thickness of said polethylene film is about 1.5 mils.

5. Process in accordance with claim 1, wherein said film is formed of relatively low melting polyethylene, and said heating is at a temperature of from about 250° to about 320° F. for from about 10 to about 60 seconds.

References Cited by the Examiner

UNITED STATES PATENTS 2,697,664  12/54  Goeser et al. _____ 154—46

FOREIGN PATENTS 728,203  4/55  Great Britain.

EARL M. BERGERT, *Primary Examiner.*